US007366959B2

(12) United States Patent  
Mizumaki

(10) Patent No.: US 7,366,959 B2  
(45) Date of Patent: Apr. 29, 2008

(54) MANAGING METHOD OF ELECTRICAL DEVICE, MANAGEMENT APPARATUS, ELECTRICAL DEVICE, COMMUNICATIONS DEVICE, PROGRAM THEREFOR, AND MANAGEMENT SYSTEM OF ELECTRICAL DEVICE

(75) Inventor: Hidetaka Mizumaki, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 486 days.

(21) Appl. No.: 10/387,582

(22) Filed: Mar. 12, 2003

(65) Prior Publication Data

US 2004/0078670 A1   Apr. 22, 2004

(30) Foreign Application Priority Data

Jul. 16, 2002 (JP) ............................ 2002-207098  
Nov. 21, 2002 (JP) ............................ 2002-338516

(51) Int. Cl.  
*G06F 11/00* (2006.01)

(52) U.S. Cl. ...................... 714/47; 340/3.21; 702/183; 702/185; 702/188

(58) Field of Classification Search ................ 340/3.21  
See application file for complete search history.

(56) References Cited

U.S. PATENT DOCUMENTS

| | | | | |
|---|---|---|---|---|
| 4,703,306 A | * | 10/1987 | Barritt | 340/310.18 |
| 5,072,370 A | * | 12/1991 | Durdik | 714/47 |
| 5,491,791 A | * | 2/1996 | Glowny et al. | 714/37 |
| 5,512,979 A | * | 4/1996 | Ogura | 399/8 |
| 5,708,775 A | * | 1/1998 | Nakamura | 714/48 |
| 6,237,114 B1 | * | 5/2001 | Wookey et al. | 714/47 |

(Continued)

FOREIGN PATENT DOCUMENTS

JP    11-004222    1/1999

(Continued)

OTHER PUBLICATIONS

U.S. Appl. No. 09/969,407, filed Oct. 2, 2001, Y. Nakai et al.

(Continued)

*Primary Examiner*—Robert Beausoliel  
*Assistant Examiner*—Philip Guyton  
(74) *Attorney, Agent, or Firm*—David G. Conlin; Steven M. Jensen; Edwards Angell Palmer & Dodge LLP

(57) ABSTRACT

A communications processing section of a management apparatus sends a request for malfunction information via the Internet to one or more electrical devices being managed. A database manager of the management apparatus refers to data stored in a database and updates the record of the electrical device therein. A timing control section of the management apparatus carries out control so that the number of electrical devices requested upon by the management apparatus does not exceed a predetermined value. In this way, despite the management apparatus centrally manages the malfunction information of each electrical device, a peak quantity of the malfunction information received by the management apparatus can be suppressed and the workload on the management apparatus can be relieved, as opposed to the case where each electrical device sends the malfunction information at its own timing. As a result, a management system of electrical devices is provided, which is capable of managing malfunction information of electrical devices without putting a heavy workload on the management apparatus.

36 Claims, 7 Drawing Sheets

U.S. PATENT DOCUMENTS

| | | | |
|---|---|---|---|
| 6,324,659 B1* | 11/2001 | Pierro | 714/48 |
| 6,717,660 B1* | 4/2004 | Bernardo | 356/121 |
| 6,735,641 B1* | 5/2004 | Kobayashi et al. | 710/15 |
| 6,772,096 B2* | 8/2004 | Murakami et al. | 702/184 |
| 6,947,675 B2* | 9/2005 | Koyama et al. | 399/8 |
| 2005/0099314 A1* | 5/2005 | Aisa | 340/637 |
| 2005/0225426 A1* | 10/2005 | Yoon et al. | 340/3.21 |

FOREIGN PATENT DOCUMENTS

| | | |
|---|---|---|
| JP | 11-120426 | 4/1999 |
| JP | 11-275102 | 10/1999 |
| JP | 2001-008276 | 1/2001 |
| JP | 2001-208405 | 8/2001 |
| JP | 2001-251323 | 9/2001 |
| JP | 2002-027577 | 1/2002 |

OTHER PUBLICATIONS

U.S. Appl. No. 09/961,812, filed Sep. 24, 2001, M. Nakamura et al.

* cited by examiner

FIG. 8
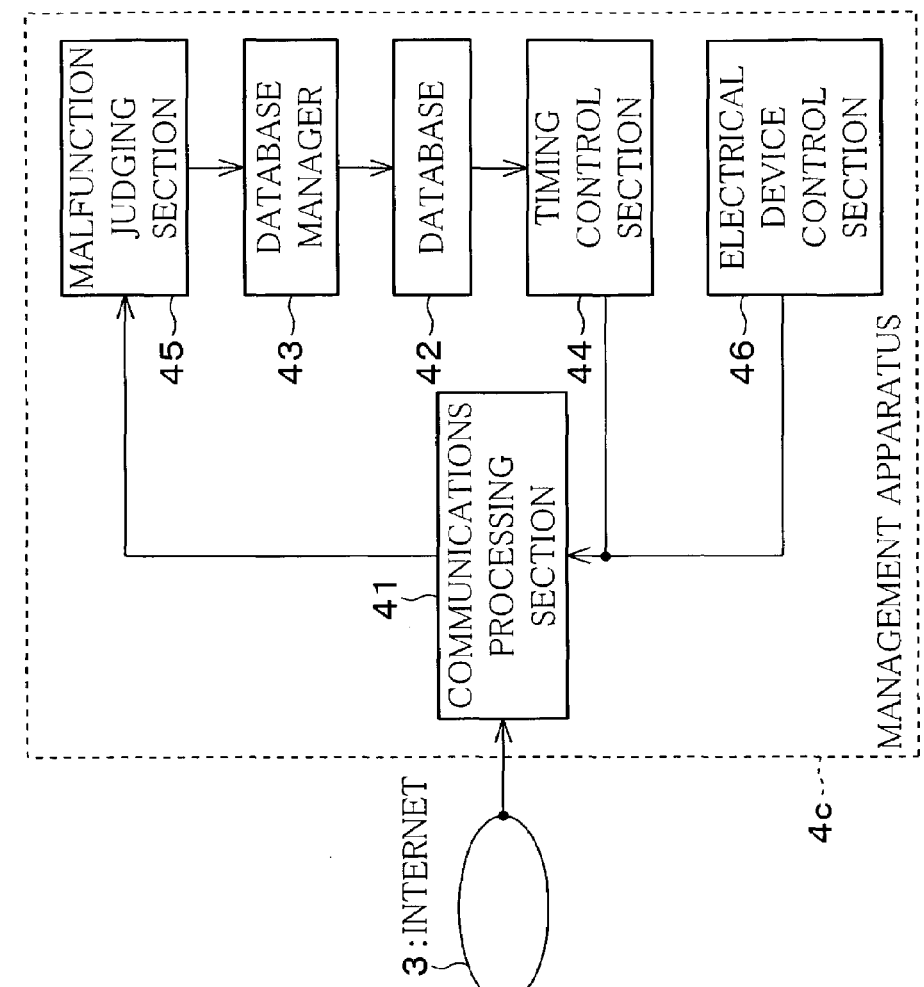
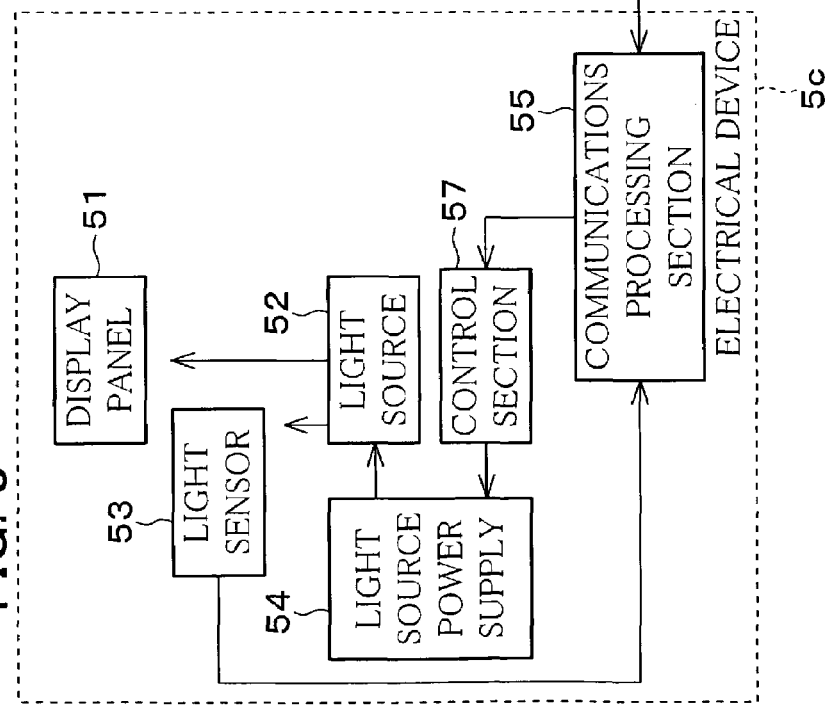

MANAGING METHOD OF ELECTRICAL DEVICE, MANAGEMENT APPARATUS, ELECTRICAL DEVICE, COMMUNICATIONS DEVICE, PROGRAM THEREFOR, AND MANAGEMENT SYSTEM OF ELECTRICAL DEVICE

FIELD OF THE INVENTION

The present invention relates to a managing method of electrical devices, a management apparatus, an electrical device, a communications device, a program therefore, and a management system of electrical devices, which are used to manage malfunction information of electrical devices via the Internet.

BACKGROUND OF THE INVENTION

The development of the Internet over the last years has made it possible to connect various types of electrical devices to one another. Notable examples of such electrical devices are personal computers and information portable terminals. The information exchanged between such devices is commonly video information, such as characters and images, and audio information. Further, as the broadband network connection becomes more popular, the always-on connections are taking over the dial-up connections as a means to access the Internet.

One form of Internet connection that has been getting attention recently is a power line communications system, which uses the power lines of homes and other places as an interface. In such a power line communications system, the power line used to supply power to the electrical device is used to make an Internet connection. An example of such a technique is disclosed in Japanese Publication for Unexamined Patent Application No. 275102/1999 (Tokukaihei 11-275102, published on Oct. 8, 1999). Another example is found in Japanese Publication for Unexamined Patent Application No. 27577/2002 (published on Jan. 25, 2002), which discloses making Internet connections via telephone lines by controlling a power supply to electrical devices.

Further, the wide-spread use of the Internet have brought a variety of Internet-connectable devices, which include not only information processing devices such as personal computers and information portable terminals but also other types of devices such as a microwave that can download a recipe via the Internet, for example.

SUMMARY OF THE INVENTION

Under normal operating conditions, such conventional electrical devices essentially communicate through the input of instructions from users. In the event where a malfunction is found in the electrical device, the user first contacts the retailer or manufacturer of the electrical device to notify them of the malfunction and ask for any necessary measures to be taken.

In this case, the retailer or manufacturer of the electrical device becomes aware of the malfunction only after they are notified of the malfunction from the user. This makes it difficult for the retailer or manufacturer of the electrical device to promptly respond to the malfunction.

Meanwhile, in an event of malfunction, there are cases where users of the electrical devices send e-mail to the retailer or manufacturer of the electrical device to notify them of the malfunction. In this case, a management apparatus of electrical devices may receive a large number of e-mails at once when the number of electrical devices managed by the management apparatus is large. This increases the peak quantity of data received and processed by the management apparatus.

The present invention was made in view of the foregoing problems, and accordingly it is an object of the present invention to provide a managing method of electrical devices, a management apparatus, an electrical device, a communications device, a program therefore, and a management system of electrical devices, which can be used to manage malfunction information of electrical devices without putting a heavy workload on the management apparatus.

In order to achieve the foregoing object, a managing method of an electrical device according to the present invention includes the steps of: sending a request for malfunction information with respect to one or more electrical devices from a management apparatus via the Internet either to a communications device connected to the electrical device being managed or to the electrical device itself being managed; returning the malfunction information, indicative of a malfunction of the electrical device, to the management apparatus from the communications device or the electrical device itself, in response to the request for malfunction information from the management apparatus; and setting, by the management apparatus, a timing of sending the request for malfunction information with respect to one or more electrical devices.

According to this method, in the step of returning malfunction information, the malfunction information of the electrical device is sent to the management apparatus via the Internet. This enables the management apparatus to manage malfunction information of each electrical device irrespective of the location of the electrical device, so long as the electrical device can be connected to the management apparatus via the Internet. This in turn enables a user of the management apparatus to respond to the malfunction more promptly, as opposed to the case where the user of the management apparatus becomes aware of the malfunction only after there was notification from a user of the electrical device.

Further, because each electrical device sends the malfunction information in response to a request from the management apparatus, and because the timing of sending the request for malfunction information to each electrical device is set by the management apparatus, the management apparatus can control the peak data quantity of the malfunction information it receives. In this way, despite the management apparatus centrally manages the malfunction information of each electrical device, a peak quantity of data received by the management apparatus can be suppressed, as opposed to the case where each electrical device sends the malfunction information at its own timing. This relieves a workload on the management apparatus in terms of hardware, thereby reducing the cost of constructing the management system of electrical devices.

Note that, the management apparatus can set any timing for sending the request for malfunction information. For example, the request may be sent to a target electrical device when the management apparatus has enough managing power. Further, the management apparatus can select a target electrical device by sending or not sending a request for malfunction information. Namely, target devices can be switched between time zones (e.g., day and night) by acquiring and referring to individual information of the target electrical devices. More specifically, the target electrical devices can be switched on a time basis, so that, for example, display devices for personal computers for office use are selected during day, while television sets, which are usually used at homes, are selected during night and devices such as a refrigerator, which are always ON, are selected all hours. By thus allowing the management apparatus to switch the target electrical devices according to various conditions such as time, the number of electrical devices that can be managed at a given time can be increased.

The managing method of an electrical device may further include the step of sending control instructions from the management apparatus via the Internet to the communications device of the electrical device or to the electrical device itself, and the step of controlling the electrical device based on the control instructions by the communications device of the electrical device or by the electrical device itself.

Here, most of the components required to send the control instructions can also be used to send a request for malfunction information. This enables the electrical devices to be remote-controlled without greatly increasing the number of components required to manage the malfunction information.

Further, in order to achieve the foregoing object, a management apparatus according to the present invention includes: sending means for sending a request for malfunction information with respect to one or more electrical devices via the Internet either to a communications device connected to the electrical device being managed or to the electrical device itself being managed; updating means, in receipt of the malfunction information indicative of a malfunction of the electrical device from the communications device or the electrical device itself, for updating a database that stores the malfunction information of the electrical device, based on the malfunction information; and timing setting means for setting a timing of sending the request for malfunction information with respect to one or more electrical devices from the sending means.

According to this arrangement, as with the foregoing managing method of an electrical device, each electrical device sends malfunction information in response to a request for malfunction information from the management apparatus, and the management apparatus sets the timing of sending the request for malfunction information with respect to each electrical device. This enables the management apparatus to control the peak data quantity of the malfunction information it receives. In this way, despite the management apparatus centrally manages the malfunction information of each electrical device, a peak quantity of data received by the management apparatus can be suppressed, as opposed to the case where each electrical device sends the malfunction information at its own timing. This enables the management apparatus to centrally manage the malfunction information of each electrical device without putting a heavy workload on the management apparatus, thereby enabling a user of the management apparatus to respond to the malfunction more promptly, as opposed to the case where the user of the management apparatus becomes aware of the malfunction only after there was notification from a user of the electrical device.

For a fuller understanding of the nature and advantages of the invention, reference should be made to the ensuing detailed description taken in conjunction with the accompanying drawings.

BRIEF DESCRIPTION OF THE DRAWINGS

FIG. 8 is a block diagram showing a structure of a relevant part of the management system of the electrical device according to another embodiment of the present invention.

DESCRIPTION OF THE EMBODIMENTS

First Embodiment

Figure 1:
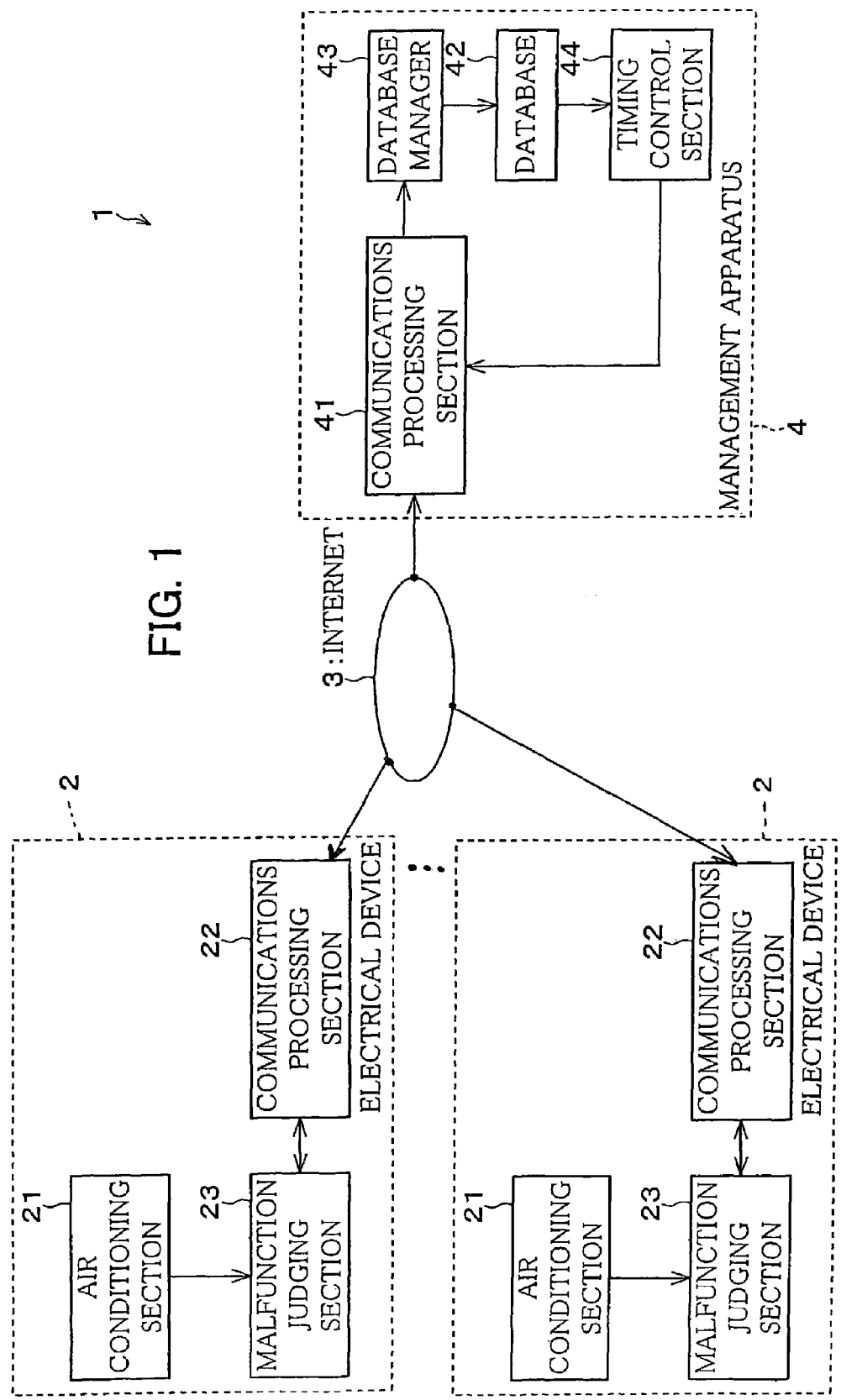
FIG. 1 is a block diagram showing a structure of a relevant part of a management system of electrical devices according to one embodiment of the present invention.

Referring to FIG. 1 through FIG. 7, one embodiment of the present invention is described below. A management system 1 according to the present embodiment is a system that can centrally manage malfunction of electrical devices of remote locations, without putting a heavy workload on a management apparatus. As shown in FIG. 1, the management system 1 includes an electrical device 2, which is a device being managed, and a management apparatus 4, which is connected to the electrical device 2 via Internet 3, so as to manage malfunction of the electrical device 2.

The electrical device 2 according to the present embodiment is realized by an air conditioner for example, and the electrical device 2 includes: an air conditioning section 21 that is made up of various components, such as a compressor, for air conditioning; a communications processing section (receiving means, reply means) 22; and a malfunction judging section (judging means) 23. The communications processing section 22 is used to connect the electrical device 2 to the Internet 3. The malfunction judging section 23 judges whether there is a malfunction in the electrical device 2, and, in reply to a request from the management apparatus 4, instructs the communications processing section 22 to send malfunction information, which is information indicative of a malfunction, to the management apparatus 4 via the Internet 3.

In this specific example as an air conditioner, the malfunction judging section 23 of the electrical device 2 according to the present embodiment manages the electrical device 2 in terms of power and temperature settings in relation to operations of the air conditioning section 21. For example, in the event where the air conditioning section 21 does not start operating as scheduled despite the required temperature is yet to be reached, the malfunction judging section 23 judges that there is abnormality (malfunction) in the air conditioning section 21, so as to generate the malfunction information indicative of a malfunction.

Figure 2:
FIG. 2 is a drawing showing a data structure of malfunction information that is sent by the electrical device of the management system.

The malfunction information includes: a header, which indicates a start of the malfunction information; address information, which indicates the location (address) of the receiver (i.e., management apparatus 4); individual information, which identifies the sender (i.e., electrical device 2); management information, which indicates managed items of the electrical device 2, containing the contents of the malfunction; and a footer, which indicates an end of the malfunction information, as shown in FIG. 2.

In the present embodiment, the individual information includes, for example, a manufacturer's code, which indicates the manufacturer of the electrical device 2, a type code, which indicates the model number of the electrical device 2, and a serial code, which indicates the serial number of the electrical device 2. The manufacturer's code preferably complies with a unified standard, if available, which can distinguish between different manufacturers. Alternatively, the manufacturer's code may be a character code, for example, such as the ASCII code, provided that the manufacturer can be identified.

The individual information may be stored in a memory (not shown) in the electrical device 2, so that the malfunction judging section 23 can acquire the information by referring to the memory. Alternatively, the individual information may be preset in a program that realizes the malfunction judging section 23 in each electrical device 2, so that the malfunction judging section 23 in each electrical device 2 can generate the malfunction information including individual information.

As a suitable connection medium, the present embodiment uses a power line to connect the electrical device 2 to the Internet 3. Many electrical devices, including the electrical device 2 according to the present embodiment, use the power line to receive power. When using the electrical device 2, a user of the electrical device 2, for example, plugs in the power line of the electrical device 2 to an outlet, so that the power can be supplied from a power supply facility via the power line.

In this way, by accessing the Internet 3 via the power line, the electrical device 2 can be connected to the Internet 3 only by connecting the power line to the power supply facility, without additionally providing a new communications path for the user of the electrical device 2. As a result, the user of the electrical device 2 can connect the electrical device 2 to the Internet 3 without recognizing the presence of the communications line.

Further, because the power line serves as a communications line, the electrical device 2 can be connected to the Internet 3 any time the power is supplied and the electrical device 2 is available to the user. That is, the electrical device 2 will not be used without being connected to the communications line, which might occur when a separate communications line is used instead of the power line. In this way, it is ensured that the management apparatus 4 manages all the electrical devices 2.

Figure 3:
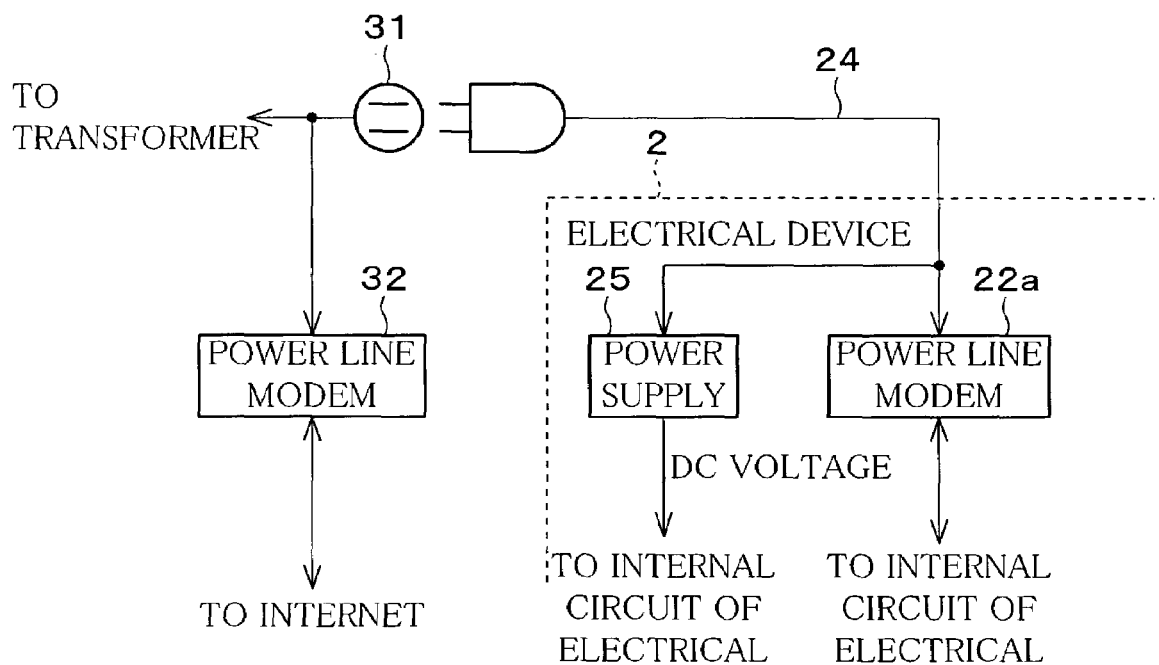
FIG. 3 is a block diagram showing how the electrical device of the management system is connected to the Internet.

Specifically, the communications processing section 22 according to the present embodiment is realized by a power line modem 22a as shown in FIG. 3. The power line modem 22a operates as a slave to send and receive data, via a power line 24 of the electrical device 2 and via an outlet 31, to and from a power line modem 32 that operates as a master. Note that, the outlet 31 and the power line modem 22a are provided at places where the electrical device 2 is installed (for example, in a house). The power line modem 32 operating as a master is connected to the Internet 3 to relay the power line modem 22a (communications processing section 22) or the electrical device 2 to the Internet 3.

The electrical device 2 also includes a power supply 25. The power supply 25 is connected to a power supply facility (e.g., transformer, not shown) of a power supply system via the power line 24 and the outlet 31, so as to receive power therefrom. In the present embodiment, the components (for example, malfunction judging section 23) of the electrical device 2 operate on DC voltage, and therefore the AC power from the power supply facility is converted into DC power by the power supply 25, so that DC power can be supplied to these components.

The management apparatus 4 includes a communications processing section (sending means) 41, a database 42, a database manager (updating means) 43, and a timing control section (timing deciding means) 44, as shown in FIG. 1. The communications processing section 41 is used to connect the management apparatus 4 to the Internet 3. The database 42 stores malfunction information of each electrical device 2 managed by the management apparatus 4. The database manager 43 refers to the data stored in the database 42 and updates the record of the electrical device 2 based on the malfunction information that was sent from the electrical device 2. The timing control section 44 controls the timing at which the communications processing section 41 sends a request for malfunction information to the electrical device 2.

The timing control section 44 controls the timing of sending the request so that the number of electrical devices 2 being requested by the communications processing section 41 to send the malfunction information does not exceed a predetermined number. For example, this can be done by sending a request for malfunction information to a certain number of groups of electrical devices 2 at predetermined time intervals.

The timing control section 44 may be adapted to monitor a load on the management apparatus 4 and delay sending the request for malfunction information when the load exceeds a predetermined value. Further, the timing control section 44 may send the request for malfunction information by avoiding the time in which a heavy load is expected, instead of or in addition to monitoring a load.

It should be noted here that the management apparatus 4 cannot grasp malfunctions that occur between requests to the electrical device 2. Thus, if the management apparatus 4 were to grasp a malfunction of the electrical device 2 before a user of the electrical device 2 notifies it, the timing control section 44 should preferably control the request intervals below the average time or expected time of arrival of malfunction information from a user of the electrical device 2.

The database 42 stores a record of each electrical device 2 being managed, each record containing history of malfunction information of the corresponding electrical device 2. The record of each electrical device 2 also contains an access method to the electrical device 2 (for example, the address of the electrical device 2), so that the communications processing section 41 can access each electrical device 2 by referring to the database 42.

Figure 4:
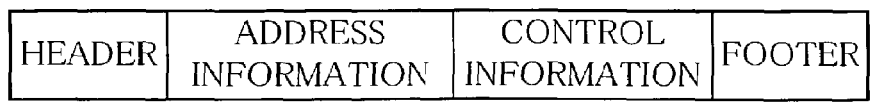
FIG. 4 is a drawing showing a data structure of a request sent by a management apparatus of the management system.

The request for malfunction information includes: a header, which indicates a start of the request for malfunction information; address information, which indicates the address of the receiver (i.e., the electrical device 2); control information, which is the information requesting malfunction information; and a footer, which indicates an end of the request for malfunction information, as shown in FIG. 4 for example. The control information according to the present embodiment includes the address of the sender, i.e., the management apparatus 4, so that the malfunction judging section 23 of the electrical device 2, when sending the malfunction information, can acquire the address of the management apparatus 4 based on the address contained in the control information.

Note that, each component of the management apparatus 4 and the electrical device 2 may be a functional block that is realized in the form of a program stored in a recoding medium such as ROM or RAM, and that is run by arithmetic means such as a CPU. Alternatively, hardware having an equivalent function may be used therefore. Further, such hardware may be used in combination with the arithmetic means, so that part of the process is carried out by the hardware while the arithmetic means runs a program that controls the hardware and carries out the remaining process.

It should be noted here that general-purpose computers can operate as the management apparatus 4 according to the present embodiment only by running a program, when they are adapted to operate on a program for managing electrical devices as in the management apparatus 4 according to the present embodiment.

Further, in order to run a program, the arithmetic means may be used either individually or in combination by being connected to one another via a bus or other communications paths within the device or apparatus. The arithmetic means runs a program that is distributed in the form of a recording medium carrying the program itself or program data for creating the program, or runs the program data that is distributed via cable or wireless communications means.

The recording medium used to distribute the program data is preferably removable but is not necessarily to be removable after the program data has been distributed. Further, whether or not the recording medium is rewritable (writable) or volatile is not particularly important as long as the program data is stored in the recording medium. Further, the recording method or the shape of the recording medium is not particularly important either as long as the program data is stored in the recording medium. Examples of the recording medium include: tapes such as magnetic tapes or cassette tapes; magnetic disks such as floppy (registered trademark) disks or hard disks; or other types of disks such as CD-ROM, magneto-optical disks (MO), mini disks (MD), and digital video disks (DVD). Further, the recording medium may be cards such as IC cards or optical cards, or a semiconductor memory such as mask ROM, EPROM, EPROM, and flash ROM.

The program data may be a code that instructs the arithmetic means to carry out all procedures of the foregoing process. Alternatively, a code or a pointer may be used to instruct the arithmetic means to call for a basic program, so as to replace all procedures of the process either partially or entirely, if such a basic program (e.g., operating system or library) exists as to enable the process to be carried out either partially or entirely when called upon by predetermined procedures.

The program data may be stored in the recording medium, for example, by placing it on a real memory, so that the program data can be accessed and run by the arithmetic means. Alternatively, the program data may be stored by being installed in a local recording medium (e.g., real memory, hard disk) that can be accessed by the arithmetic means any time, before actually placing the program data on the real memory. Further, the program data may be stored in a form before being installed in the local recording medium from a network or a portable recording medium. Furthermore, the program data is not just limited to an object code after compiling but may be stored as a source code or an intermediate code that is generated in the process of interpretation or compiling. Regardless of how the program data is stored in the recording medium, the same effect can be obtained when the program data can be converted into a form that can be run by the arithmetic means by the process of decompression, coding, interpretation, compiling, linking, or placing it on a real memory, or by a combination of these processes.

Figure 5:
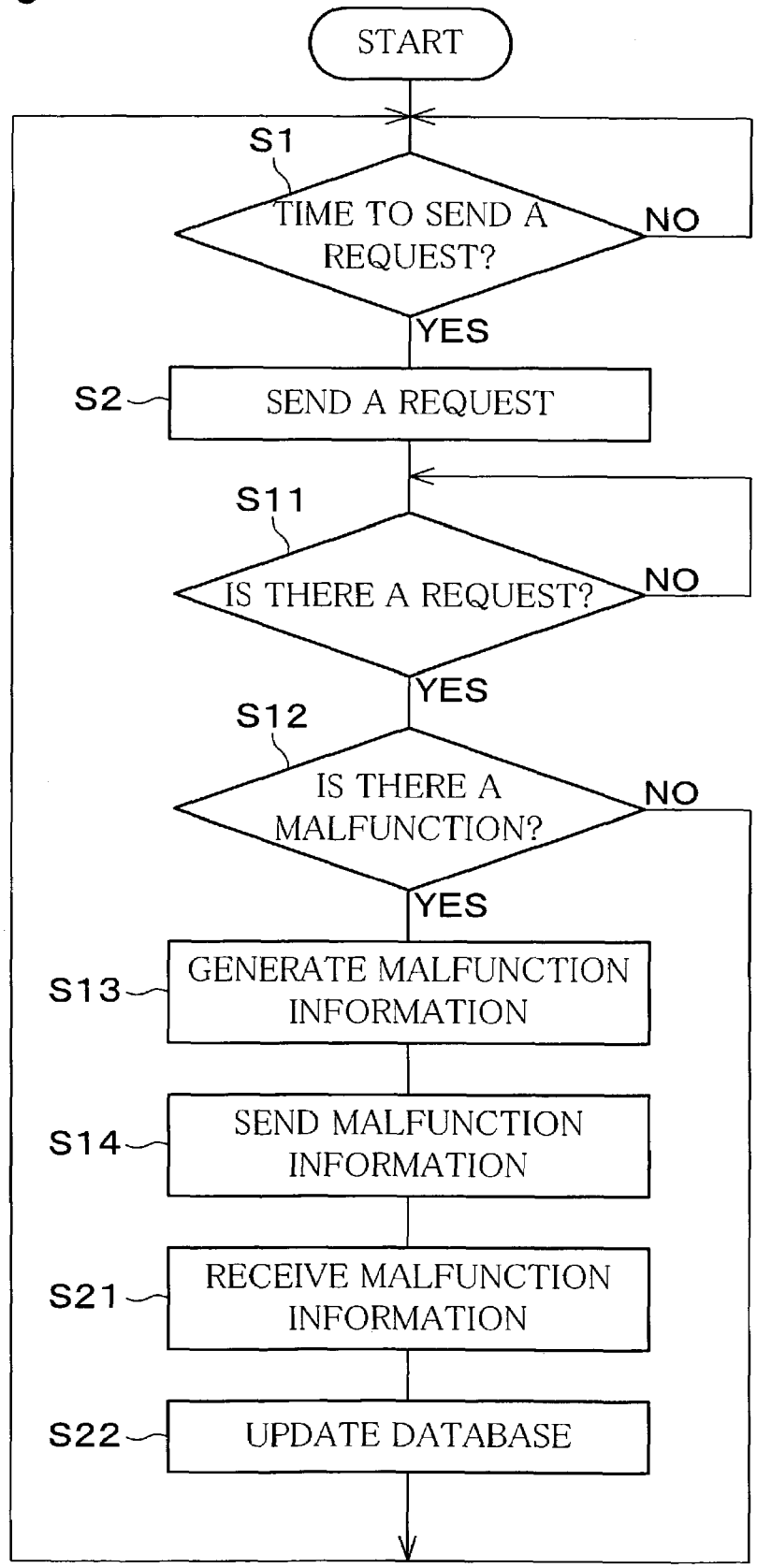
FIG. 5 is a flowchart showing operations of the management system.

Referring to FIG. 5, the following describes how the malfunction information of each electrical device 2 is stored in the database 42 of the management apparatus 4 according to the foregoing arrangement. In Step 1 (S1, where "S" stands for step), the timing control section 44 of the management apparatus 4 judges whether it is time to send a request for malfunction information to the electrical device 2 being managed.

If it is judged that a request should be sent to the electrical device 2 ("YES" in S1), the timing control section 44 instructs the communications processing section 41 to send a request for malfunction information to the electrical device 2 (S2).

The electrical device 2, standing by to receive a request for malfunction information from the management apparatus 4 in S11, receives the request via the communications processing section 22 ("YES" in S11). In response, the malfunction judging section 23 in S12 judges whether there is a malfunction in the electrical device 2. When a malfunction is found ("YES" in S12), the malfunction judging section 23 generates malfunction information that includes management information, which indicates the malfunction, and individual information, which indicates the electrical device 2 (S13). In addition, the malfunction judging section 23 instructs the communications processing section 22 to send the malfunction information to the management apparatus 4 (S14).

The malfunction information from the electrical device 2 is received by the communication processing section 41 of the management apparatus 4 (S21). In response, the database manager 43 extracts information regarding the malfunction of the electrical device 2 from the malfunction information, and, based on this information, updates the record of the electrical device 2 (S22). As a result, the record stores the most recent history of malfunctions of the electrical device 2 that has returned the malfunction information.

The foregoing processes of S1 through S22 are carried out with respect to each of electrical devices 2 that are managed by the management apparatus 4. Therefore, the database 42 of the management apparatus 4 stores the history of malfunction information of all electrical devices 2, irrespective of their locations.

Note that, in FIG. 5, no malfunction information is sent when a malfunction is not found in S12. The malfunction judging section 23 may instead send malfunction information, indicative of no malfunction, to the management apparatus 4.

In the described arrangement, the malfunction information of the electrical device 2 is sent to the management apparatus 4 via the Internet 3. This enables the management apparatus 4 to manage malfunction information of the electrical device 2 irrespective of the location of the electrical device 2, so long as the electrical device 2 can be connected to the management apparatus 4 via the Internet 3.

In this way, a user of the management apparatus 4 can grasp the history of malfunction information of each electrical device 2 on the management apparatus 4 by referring to the database 42, for example, by operating the database manager 43, prior to receiving a notification from a user of the receiving device 2. This enables the user of the management apparatus 4 (e.g., a retailer and/or a manufacturer of electrical devices 2) to quickly respond to the malfunction of the electrical device 2, thereby improving services to the electrical devices 2.

More desirably, the addresses of the users of the electrical devices 2 may be registered, for example, in the database 42. In this way, a user of the management apparatus 4 or a service person under instructions of the user can contact the user of the electrical device 2 for the malfunction or possible repair, instead of being notified of the malfunction by the user of the electrical device 2, thereby providing more customer-oriented services.

Further, by managing the malfunction information of the electrical device 2, the user of the management apparatus 4 can acquire a tendency malfunction at an early stage, by statistically analyzing the malfunction information of the electrical devices 2. This allows for early feedback of the tendency malfunction to a design section of the electrical device 2, thereby promptly responding to a need to improve the electrical device 2.

Here, as long as the contents of the malfunction are notified, the malfunction information is not necessarily required to include the individual information. Further, the malfunction information does not necessarily require a header or footer, provided that the communication protocol used can properly communicate the malfunction information without it.

However, with the individual information as in the present embodiment, the malfunction information can be used to identify the electrical device 2 experiencing the malfunction. Thus, by analyzing the malfunction information of the electrical device 2, the user of the management apparatus 4 can find the causation of the malfunction of the electrical device 2 in the shipping lot. This enables any necessary improvement to be made in the manufacturing steps of the electrical device 2, both precisely and quickly.

Further, the timing at which the electrical device 2 sends the malfunction information in response to a request from the management apparatus 4 is controlled such that the number of electrical devices 2 that receives the request from the communications processing section 41 does not exceed a predetermined number. In this way, despite the management apparatus 4 centrally manages the malfunction information of each electrical device 2, a peak quantity of the malfunction information received by the management apparatus 4 can be suppressed, as opposed to the case where each electrical device 2 sends the malfunction information at its own timing. This enables the malfunction information of electrical devices 2 of remote locations to be centrally managed without imposing a heavy workload on the management apparatus 4.

Because the management apparatus 4 is not heavily loaded as hardware, the use of management apparatus 4 will not be limited to the management system 1 of electrical devices. For example, the management apparatus 4 can serve as a server for other purposes. As a result, the cost of building the management system 1 of electrical devices can be reduced.

Incidentally, the foregoing explanation was given through the case where the electrical device being managed was an air conditioner. However, the electrical device is not just limited to such a device. The following modification example describes the case where the electrical device is a display device.

Figure 6:
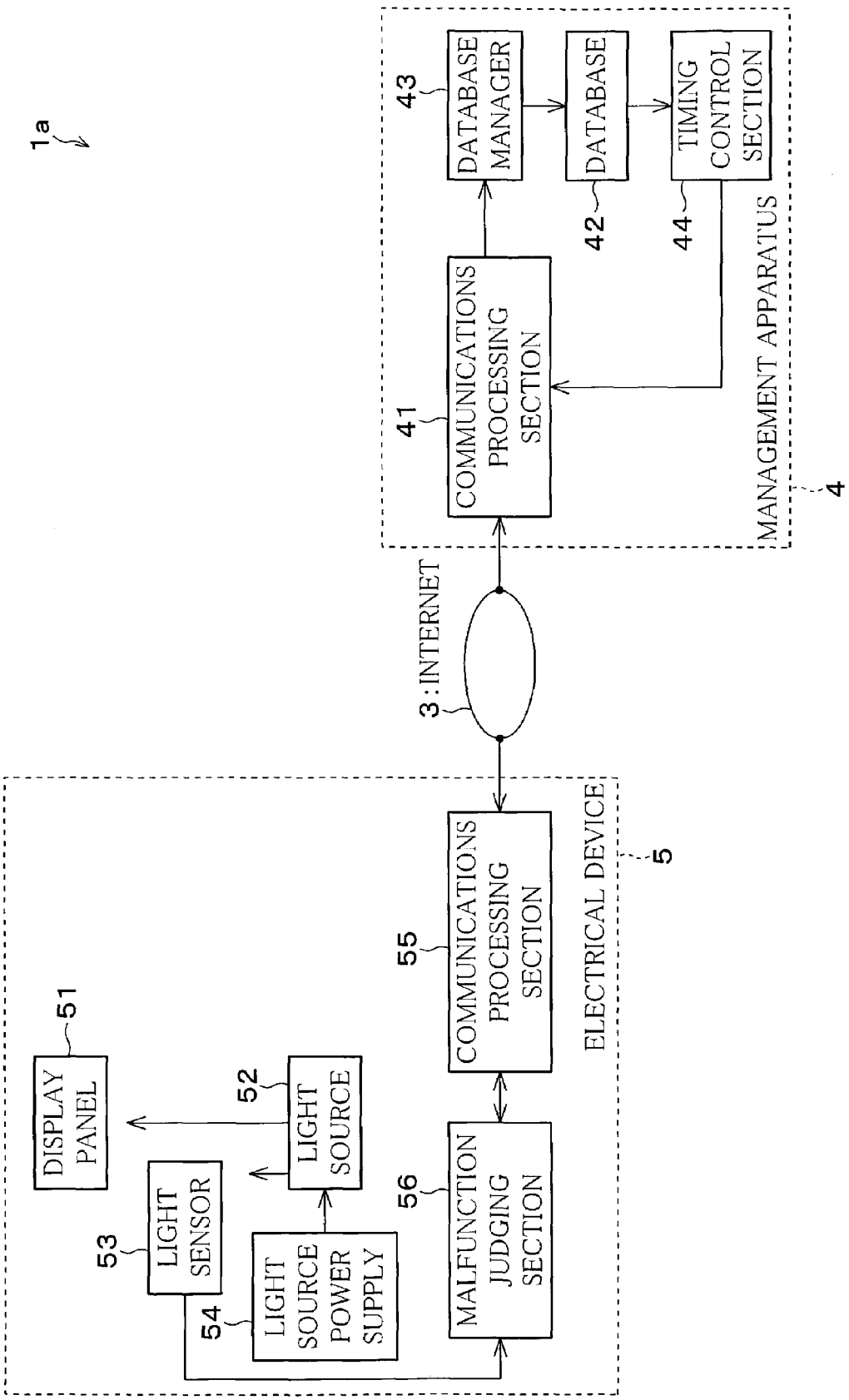
FIG. 6 is a block diagram showing a modification example of the management system.

As shown in FIG. 6, a management system 1a according to the modification example includes an electrical device 5 as a display device, instead of the electrical device (air conditioner) 2. The electrical device 5 includes a display panel 51, a light source 52 for the display panel 51, a light sensor 53 for detecting luminance of the light source 52, a light source power supply 54 for the light source 52, and a communications processing section 55 and a malfunction judging section 56, which are analogous to the communications processing section 22 and the malfunction judging section 23 of FIG. 1, respectively.

In this modification example, luminance of the display device is managed as the malfunction information of the electrical device 2, so that the malfunction judging section 56 judges there is a malfunction (repair is needed) when the luminance of the light source 52 falls below a predetermined value based on the output of the light sensor 53.

The light source 52 (e.g., fluorescent tube) of the display panel 51 is controlled to emit a maintained level of luminance by the light source power supply 54. However, the light source 52, being an expendable, tends to lose its luminance as the total hours of emission accumulates.

Thus, in S12 of FIG. 5, when the luminance of the light source 52 falls below a reference value, the malfunction judging section 56 judges that the light source 52 is malfunctioning. The luminance of the light source 52 is used to generate malfunction information including management information, before the communications processing section 55 finally sends the malfunction information. The management system 1a of the modification example operates in this manner to the same effect as that achieved by the management system 1 of FIG. 1.

The foregoing described the case where the malfunction judging section (23, 56) is provided on the side of the electrical device (2, 5). Alternatively, the malfunction information sent from the electrical device to the management apparatus (4) may contain information indicative of the presence or absence of a malfunction, so that the management apparatus (4) can judge the presence or absence of a malfunction based on this information.

Figure 7:
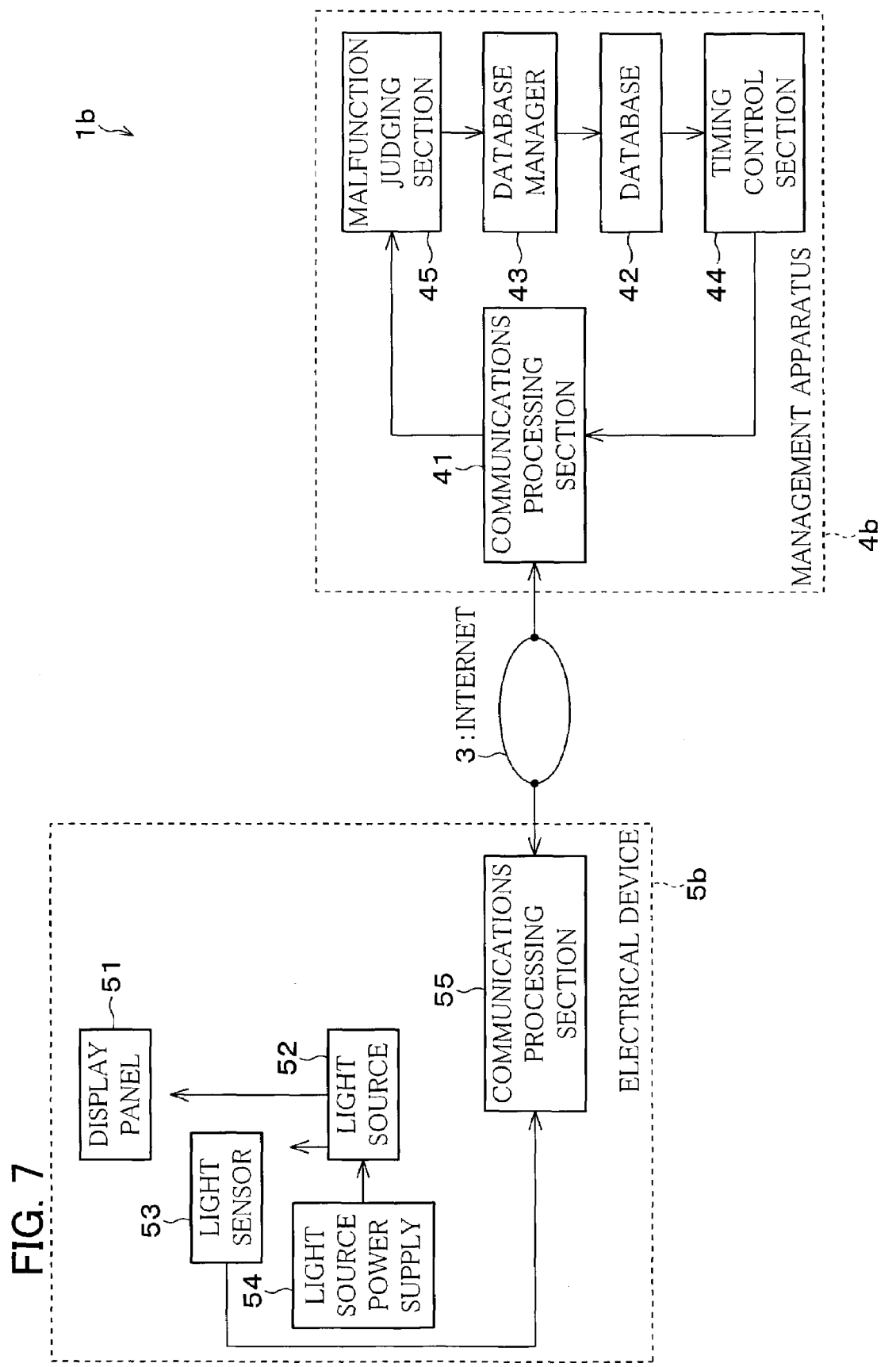
FIG. 7 is a block diagram showing another modification example of the management system.

Based on the example of FIG. 6, the following describes such a modification example by referring to a management system 1b. As shown in FIG. 7, an electrical device 5b of this modification example does not include the malfunction judging section 56. The communications processing section 55 of the electrical device 5b, in receipt of a request for malfunction information from a management apparatus 4b, sends management information to the management apparatus 4b. Here, the management information is sent as malfunction information that includes information indicative of luminance of the light source 52.

The management apparatus 4b according to this modification example additionally includes a malfunction judging section (judging means) 45, which extracts luminance of the light source 52 from the malfunction information that was sent from the electrical device 5b, so as to judge the presence or absence of a malfunction based on the luminance. The database manager 43, when a malfunction is found by the malfunction judging section 45, refers to the database 42 and updates the record of the electrical device 5b in which the malfunction was found.

In the foregoing arrangement, the information that is used to judge the presence or absence of a malfunction is sent from each electrical device 5b to the management apparatus 4b via the Internet 3. This enables the management apparatus 4b to manage malfunction information of each electrical device 5b irrespective of the location of the electrical device 5b, as in the described arrangements of FIG. 1 and FIG. 6.

Further, as in the described arrangements of FIG. 1 and FIG. 6, the timing at which the electrical device 5b sends the malfunction information in response to a request from the management apparatus 4b is controlled such that the number of electrical devices 5b that receives the request from the communications processing section 41 does not exceed a predetermined number. In this way, despite the management apparatus 4b centrally manages the malfunction information of each electrical device 5b, a peak quantity of the malfunction information received by the management apparatus 4b can be suppressed, as opposed to the case where each electrical device 5b sends the malfunction information at its own timing. This enables the malfunction information of electrical devices 5b of remote locations to be centrally managed without imposing a heavy workload on the management apparatus 4b.

Second Embodiment

The foregoing described the case where the management apparatus (4, 4b) sends a request for malfunction information to the electrical device (2, 5). In the present embodiment described below, a management apparatus 4c sends not only a request for malfunction information but also control instructions to the electrical device. The present embodiment is applicable to any of the described arrangements, among which that of FIG. 7 is referred to in the following description.

A management system 1c according to the present embodiment additionally includes an electrical device control section (control means) 46 in a management apparatus 4c, as shown in FIG. 8. The electrical device control section 46 can request the communications processing section 41 to send control instructions to an electrical device 5c. The control instructions have essentially the same structure as the request for malfunction information shown in FIG. 4, but additionally includes control information, based on which the electrical device 5c is controlled. The electrical device 5c includes a control section (control means) 57, through which the electrical device 5c is controlled based on the control instructions from the management apparatus 4c.

Here, most of the components (e.g., communications processing section 41, communications processing section 55) that are required to send the control instructions can also be used to send the request for malfunction information. This enables the management apparatus 4c to remote control the electrical devices 5c without greatly increasing the number of components from those already required to manage malfunction information.

For example, in the example of FIG. 8 in which the electrical device 5c is a display device, the electrical device control section 46 of the management apparatus 4c can function to vary a control voltage of the light source 52, so as to control luminance of the light source 52. In response, the control section 57 of the electrical device 5c acquires the control voltage as instructed by the management apparatus 4c, so as to instruct the light source power supply 54 to vary the control voltage of the light source 52 as instructed.

In this manner, the management apparatus 4c can control luminance of the light source 52, so that the light source 52, which loses its luminance as the total hours of use (ON time) increases, can be controlled within a possible range of compensation.

Note that, the foregoing embodiments described the case where a power line was used as a suitable medium for connecting the electrical devices (2, 5, 5a, 5b, 5c) to the Internet (3). However, the present invention is not just limited to this implementation as long as the electrical device can be connected to the Internet (3). For example, in an environment where a local area network is provided to make an Internet connection, the electrical device may be connected to the Internet via such a local area network and a router. The use of a power line is more advantageous, however, because it instantly allows for Internet access only by connecting the electrical device to the power line when using the electrical device. In this way, a user of the electrical device can connect the electrical device to the Internet without recognizing the presence of a connection wire. In addition, the management apparatus (4, 4a, 4b, 4c) can manage every electrical device to be managed.

Further, the foregoing described the case where the components of the electrical device (2, 5, 5a, 5b, 5c) are integrally provided. However, the present invention is not just limited to this implementation. For example, as shown in FIG. 9, the component (e.g., air conditioning section 21, display panel 51) that is used to realize the functions of the electrical device itself may be provided separately from those (e.g., communications processing section 22, malfunction judging section 23) used to send the malfunction information, wherein the former (electrical device itself) and the latter (communications device) are connected to each other by a cable or wireless communications path.

Figure 9:
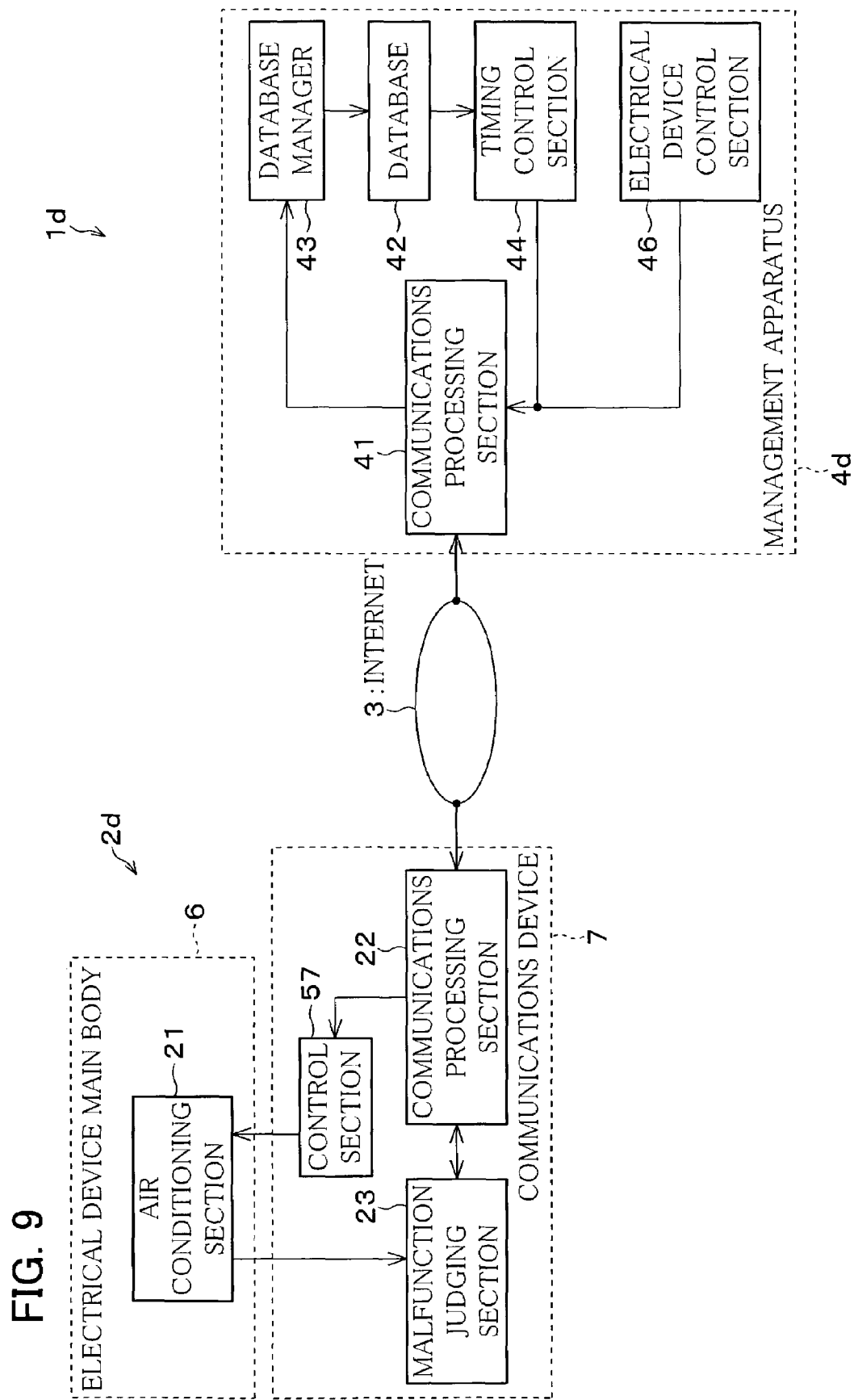
FIG. 9 is a block diagram showing a modification example of the management system.

Note that, FIG. 9 differs from FIG. 1 in that it has a compartmentalized arrangement, so that the air conditioning section 21 is provided in an electrical device main body 6, and communications processing section 22 and the malfunction processing section 23 are provided in a communications device 7. When connected, the electrical device main body 6 and the communications device 7 serve to operate as an electrical device 2d, just in the same manner as the electrical device 2 of FIG. 1.

In this case, only the electrical device main body 6 can be used when access to the Internet 3 is not required, and the communications device 7 is only required when access to the Internet 3 becomes necessary. That is, the electrical device main body 6 can be used in both applications where access to the Internet 3 is required and not required.

Further, in the example of FIG. 9, a management apparatus 4d additionally includes an electrical device control section 46, analogous to that of FIG. 8, so that the control section 57 of the communications device 7 can control the air conditioning section 21 based on control instructions from the electrical device control section 46.

In the foregoing example, the malfunction information from the electrical device (2, 5, 5a, 5b, 5c) or the communications device (7) of the management system (1, 1a, 1b, 1c, 1d) included individual information of the electrical device. However, the present invention is not just limited to this implementation. The described effects can be obtained, though to a limited extent, as long as the malfunction information of the electrical device includes information indicative of the contents of the malfunction.

However, by containing individual information in the malfunction information of the electrical device as in the foregoing embodiments, a plurality of electrical devices of the same type can be simultaneously managed. Particularly, in the management systems according to the present embodiment, by containing a type code and a serial code in the individual information as described above, the management apparatus (4, 4a, 4b, 4c, 4d) can acquire the model number and serial number of the electrical device based on the malfunction information.

Further, the foregoing embodiments described the case where a plurality of electrical devices of the same type is managed. Alternatively, the management apparatus may manage a plurality of different types of electrical devices and send a request to each of these different types of electrical devices. In this case, the same management apparatus can be used to manage different types of electrical devices (e.g., air conditioner, display device) by distinguishing these electrical devices from one another based on their malfunction information, for example, by referring to the individual information contained in the malfunction information sent from each electrical device, or by controlling the timing of sending a request for malfunction information to each electrical device and thus controlling the timing of receiving the malfunction information, so that the presence or absence of a malfunction can be judged based on the timing the malfunction information is received.

As described, a managing method of an electrical device according to the present invention includes the steps of: sending a request for malfunction information with respect to one or more electrical devices from a management apparatus (4 through 4*d*) via the Internet (3) either to a communications device (7) connected to the electrical device (6) being managed or to the electrical device (2 through 2*d*, 5 through 5*c*) itself being managed; returning the malfunction information, indicative of a malfunction of the electrical device, to the management apparatus from the communications device or the electrical device itself, in response to the request for malfunction information from the management apparatus; and setting, by the management apparatus, a timing of sending the request for malfunction information with respect to one or more electrical devices.

According to this method, in the step of returning malfunction information, the malfunction information of the electrical device is sent to the management apparatus via the Internet. This enables the management apparatus to manage malfunction information of each electrical device irrespective of the location of the electrical device, so long as the electrical device can be connected to the management apparatus via the Internet. This in turn enables a user of the management apparatus to respond to the malfunction more promptly, as opposed to the case where the user of the management apparatus becomes aware of the malfunction only after there was notification from a user of the electrical device.

Further, because each electrical device sends the malfunction information in response to a request from the management apparatus, and because the timing of sending the request for malfunction information to each electrical device is set by the management apparatus, the management apparatus can control the peak data quantity of the malfunction information it receives. In this way, despite the management apparatus centrally manages the malfunction information of each electrical device, a peak quantity of data received by the management apparatus can be suppressed, as opposed to the case where each electrical device sends the malfunction information at its own timing. This relieves a workload on the management apparatus in terms of hardware, thereby reducing the cost of constructing the management system of electrical devices.

Note that, the management apparatus can set any timing for sending the request for malfunction information. For example, the request may be sent to a target electrical device when the management apparatus has enough managing power. Further, the management apparatus can select a target electrical device by sending or not sending a request for malfunction information. Namely, target devices can be switched between time zones (e.g., day and night) by acquiring and referring to the individual information of the target electrical devices. More specifically, the target electrical devices can be switched on a time basis, so that, for example, display devices for personal computers for office use are selected during day, while television sets, which are usually used at homes, are selected during night and devices such as a refrigerator, which are always ON, are selected all hours. By thus allowing the management apparatus to switch the target electrical devices according to various conditions such as time, the number of electrical devices that can be managed at a given time can be increased.

In addition to the described arrangement, the malfunction information may include individual information for identifying an electrical device. In this case, an electrical device with a malfunction can be identified using the malfunction information, which allows a user of the management apparatus to analyze the malfunction information of the electrical device and find the causation of the malfunction of the electrical device in the shipping lot, for example. This enables any necessary improvement to be made in manufacturing steps, both precisely and quickly.

The foregoing managing method of an electrical device may further include the step of judging the presence or absence of a malfunction in the electrical device by the management apparatus based on the malfunction information, the malfunction information including information that enables the management apparatus to judge the presence or absence of a malfunction in the electrical device.

According to this method, the presence or absence of a malfunction is judged by the management apparatus. This is advantageous over the case where the function of judging the presence or absence of a malfunction is processed by the communications device of the electrical device or by the electrical device itself, or by a circuit additionally provided therein, because in this case the processing or circuit structure of these devices can be simplified. Note that, the increased amount of data processed by the management apparatus by judging the presence or absence of a malfunction does not add to a heavy workload because the peak quantity of the processed data of the malfunction information received by the management apparatus can be controlled by the management apparatus itself by setting a timing of sending a request for malfunction information.

The managing method of an electrical device may be adapted to include the step of judging, by the electrical device, the presence or absence of a malfunction in the communications device of the electrical device or in the electrical device itself, a result of judgment being incorporated in the malfunction information.

In this case, the presence or absence of a malfunction is judged by the communications device of the electrical device or the electrical device itself. This reduces the amount of data processed by the management apparatus and the amount of data transferred via the Internet.

The managing method of an electrical device may further include the step of sending control instructions from the management apparatus via the Internet to the communications device of the electrical device or to the electrical device itself, and the step of controlling the electrical device based on the control instructions by the communications device of the electrical device or by the electrical device itself.

Here, most of the components required to send the control instructions can also be used to send a request for malfunction information. This enables the electrical devices to be remote-controlled without greatly increasing the number of components required to manage the malfunction information.

Further, the managing method of an electrical device may be adapted so that, in the step of sending a request, the management apparatus sends the request for malfunction information with respect to one or more electrical devices such that the number of electrical devices being requested upon by the management apparatus does not exceed a predetermined number.

In this case, the management apparatus sends a request for malfunction information with respect to one or more electrical devices, such that the number of electrical devices requested upon by the management apparatus does not exceed a predetermined number. This suppresses the peak data quantity of the malfunction information received by the management apparatus. Thus, the malfunction information of the electrical devices can be centrally managed without putting a heavy workload on the management apparatus. This relieves a workload on the management apparatus in terms of hardware, thereby reducing the cost of constructing the management system of electrical devices.

Further, the managing method of an electrical device may be adapted so that the electrical devices being managed include different kinds of electrical devices, and, in the step of sending a request, the management apparatus sends the request to each of different kinds of electrical devices.

According to this method, a single management apparatus manages a plurality of different kinds of electrical devices. In this way, the number of management apparatuses can be reduced, compared with the case where the management apparatus is provided for each kind of electrical device. As a result, the cost of constructing a management system of a plurality of different kinds of electrical devices can be reduced.

Further, as described, a management apparatus (4 through 4*d*) according to the present invention includes: sending means (communications processing section 41) for sending a request for malfunction information with respect to one or more electrical devices via the Internet (3) either to a communications device (7) connected to the electrical device (6) being managed or to the electrical device (2 through 2*d*, 5 through 5*c*) itself being managed; updating means (database manager 43), in receipt of the malfunction information indicative of a malfunction of the electrical device from the communications device or the electrical device itself, for updating a database (42) that stores the malfunction information of the electrical device, based on the malfunction information; and timing setting means (timing control section 44) for setting a timing of sending the request for malfunction information with respect to one or more electrical devices from the sending means.

According to this arrangement, as with the foregoing managing method of an electrical device, each electrical device sends malfunction information in response to a request for malfunction information from the management apparatus, and the management apparatus sets the timing of sending the request for malfunction information with respect to each electrical device. This enables the management apparatus to control the peak data quantity of the malfunction information it receives. In this way, despite the management apparatus centrally manages the malfunction information of each electrical device, a peak quantity of data received by the management apparatus can be suppressed, as opposed to the case where each electrical device sends the malfunction information at its own timing. This enables the management apparatus to centrally manage the malfunction information of each electrical device without putting a heavy workload on the management apparatus, thereby enabling a user of the management apparatus to respond to the malfunction more promptly, as opposed to the case where the user of the management apparatus becomes aware of the malfunction only after there was notification from a user of the electrical device.

The foregoing management apparatus may further includes judging means (malfunction judging section 45) for judging the presence or absence of a malfunction in the electrical device based on the malfunction information, the malfunction information including information that enables the management apparatus to judge the presence or absence of a malfunction in the electrical device.

According to this arrangement, the presence or absence of a malfunction is judged by the judging means. This is advantageous over the case where the function of judging the presence or absence of a malfunction is processed by the communications device of the electrical device or by the electrical device itself, or by a circuit additionally provided therein, because in this case the processing or circuit structure of these devices can be simplified.

Further, the management apparatus may be adapted to further include control means (electrical device control section 46) for sending control instructions with respect to one or more electrical devices via the Internet to the communications device of the electrical device or to the electrical device itself.

Here, most of the components required to send the control instructions can also be used to send the request for malfunction information. This enables the electrical devices to be remote controlled without greatly increasing the number of components required to manage the malfunction information.

Further, the management apparatus may be adapted so that the timing setting means sets the timing of sending the request for malfunction information with respect to one or more electrical devices such that the number of electrical devices being requested upon does not exceed a predetermined number.

According to this arrangement, the management apparatus sends a request for malfunction information to each electrical device such that the number of electrical devices requested upon by the management apparatus does not exceed a predetermined number. This suppresses the peak data quantity of the malfunction information received by the management apparatus. Thus, the malfunction information of the electrical devices can be centrally managed without putting a heavy workload on the management apparatus. This relieves a workload on the management apparatus in terms of hardware, thereby reducing the cost of constructing the management system of the electrical devices.

Further, the management apparatus may be adapted so that the electrical devices being managed include different kinds of electrical devices, and the sending means sends the request to each of different kinds of electrical devices.

According to this method, a single management apparatus manages a plurality of different kinds of electrical devices. In this way, the number of management apparatuses can be reduced, compared with the case where the management apparatus is provided for each kind of electrical device. As a result, the cost of constructing a management system of a plurality of different kinds of electrical devices can be reduced.

Incidentally, the management apparatus may be realized in the form of hardware, or by running a computer-program. More specifically, a computer-program according to the present invention is used to cause a computer to execute procedures as the foregoing means. By running the computer-program, the computer operates as the management apparatus. This enables the malfunction information of each electrical device to be centrally managed without putting a heavy workload on the management apparatus, thereby enabling a user of the management apparatus to respond to the malfunction more promptly, as opposed to the case where the user of the management apparatus becomes aware of the malfunction only after there was notification from a user of the electrical device.

Further, as described, an electrical device (2 through 2d, 5 through 5c) according to the present invention include: receiving means (communications processing section 22, 55) for receiving a request for malfunction information via the Internet (3) from a management apparatus (4 through 4d) that includes timing setting means (timing control section 44) for setting a timing of sending the request for malfunction information with respect to one or more electrical devices being managed; and reply means (communications processing section 22, 55), in response to the request for malfunction information, for returning the malfunction information, indicative of a malfunction, to the management apparatus.

According to this arrangement, as with the foregoing managing method of an electrical device, each electrical device sends malfunction information in response to a request for malfunction information from the management apparatus, and the management apparatus sets the timing of sending the request for malfunction information with respect to each electrical device. This enables the management apparatus to control the peak data quantity of the malfunction information it receives. In this way, despite the management apparatus centrally manages the malfunction information of each electrical device, a peak quantity of data received by the management apparatus can be suppressed, as opposed to the case where each electrical device sends the malfunction information at its own timing. This enables the management apparatus to centrally manage the malfunction information of each electrical device without putting a heavy workload on the management apparatus, thereby enabling a user of the management apparatus to respond to the malfunction more promptly, as opposed to the case where the user of the management apparatus becomes aware of the malfunction only after there was notification from a user of the electrical device.

Further, the electrical device may be adapted so that the receiving means and the reply means are connected to the Internet via a power line (24) that is used to supply power to the electrical device. This instantly allows for Internet access only by connecting the electrical device to the power line when using the electrical device. In this way, a user of the electrical device can connect the electrical device to the Internet without recognizing the presence of a connection wire. In addition, the management apparatus can manage every electrical device to be managed.

Further, the electrical device may be adapted so that the malfunction information sent by the reply means include individual information for identifying the electrical device. In this case, an electrical device with a malfunction can be identified using the malfunction information, which allows a user of the management apparatus to analyze the malfunction information of the electrical device and find the causation of the malfunction of the electrical device in the shipping lot, for example. This enables any necessary improvement to be made in manufacturing steps, both precisely and quickly.

Further, the electrical device may be adapted to further include judging means for judging the presence or absence of a malfunction, a result of judgment being incorporated in the malfunction information sent by the reply means. In this case, the presence or absence of a malfunction is judged by the communications device of the electrical device or the electrical device itself. This reduces the amount of data processed by the management apparatus and the amount of data transferred via the Internet. Specifically, a circuit may be provided in the electrical device so that a malfunction is judged within the electrical device. In this case, the circuit can be used as the judging means. This makes it possible to reduce the amount of data processed by the management apparatus and the amount of data transferred via the Internet, without greatly increasing the number of components in the electrical device.

Further, the electrical device may be adapted to further include control means (control section 57) for controlling the electrical device according to control instructions, when the control instructions are sent from the management apparatus via the Internet and received by the electrical device. Here, most of the components required to send the control instructions can also be used to send the request for malfunction information. This enables the electrical devices to be remote controlled without greatly increasing the number of components required to manage the malfunction information.

Further, a communications device (7) according to the present invention is connectable to an electrical device (6) and includes the receiving means and reply means (communications processing section 22). The communications device, when connected to the electrical device, operates as the electrical device. This enables the malfunction information of each electrical device to be centrally managed without putting a heave workload on the management apparatus, thereby enabling a user to the management apparatus to more promptly respond to the malfunction.

Incidentally, the electrical device or the management apparatus may be realized in the form of hardware, or by running a computer-program. More specifically, a computer-program according to the present invention is used to cause a computer to execute procedures as the foregoing means. By running the computer-program, the computer operates as the electrical device or the management apparatus. This enables the malfunction information of each electrical device to be centrally managed without putting a heavy workload on the management apparatus, thereby enabling a user of the management apparatus to more promptly respond to the malfunction.

Further, as described, the management system according to the present invention includes the management apparatus (4 through 4d), and the communications device (7) of the electrical device or the electrical device (2 through 2d, 5 through 5c) itself.

According to this arrangement, as with the foregoing managing method of an electrical device, each electrical device sends malfunction information in response to a request for malfunction information from the management apparatus, and the management apparatus sets the timing of sending the request for malfunction information with respect to each electrical device. This enables the management apparatus to control the peak data quantity of the malfunction information it receives. In this way, despite the management apparatus centrally manages the malfunction information of each electrical device, a peak quantity of data received by the management apparatus can be suppressed, as opposed to the case where each electrical device sends the malfunction information at its own timing. This enables the management apparatus to centrally manage the malfunction information of each electrical device without putting a heavy workload on the management apparatus, thereby enabling a user of the management apparatus to respond to the malfunction more promptly, as opposed to the case where the user of the management apparatus becomes aware of the malfunction only after there was notification from a user of the electrical device.

Further, the management system of an electrical device may be adapted so that the management apparatus includes timing setting means that sets the timing of sending the request for malfunction information with respect to one or more electrical devices such that the number of electrical devices being requested upon does not exceed a predetermined number. This relieves a workload on the management apparatus in terms of hardware and reduces the cost of constructing the management system of an electrical device, as with the foregoing management apparatus.

Further, the management system of an electrical device may be adapted so that the management apparatus sends a request for malfunction information to a plurality of different kinds of electrical devices. In this case, as with the management apparatus of the foregoing arrangement, the number of management apparatus in the management system can be reduced, thereby reducing the cost of constructing the management system of a plurality of different kinds of electrical devices.

Further, the management system of an electrical device may be adapted so that the receiving means and the reply means are connected to the Internet via a power line that is used to supply power to the electrical device. This instantly allows for Internet access only by connecting the electrical device to the power line when using the electrical device. In this way, a user of the electrical device can connect the electrical device to the Internet without recognizing the presence of a connection wire. In addition, the management apparatus can manage every electrical device to be managed.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A managing method of one or more electrical devices, comprising the steps of:
   providing one or more of the electrical devices at a plurality of remote locations;
   sending a request for malfunction information with respect to one or more of the electrical devices from a management apparatus via the Internet either to a communications device connected to the electrical device being managed or to the electrical device itself being managed, the management apparatus operably connected to all of the electrical devices at the plurality of remote locations;
   returning the malfunction information, indicative of a malfunction of the electrical device, to the management apparatus from the communications device or the electrical device itself, in response to the request for malfunction information from the management apparatus; and
   controlling, by the management apparatus, a timing for sending the request, monitoring a load on the management apparatus, and delaying the timing for sending the request when the load exceeds a predetermined value.

2. The method as set forth in claim 1, wherein the malfunction information includes individual information for identifying the electrical device.

3. The method as set forth in claim 2, wherein the individual information includes a manufacturer's code indicative of a manufacturer of the electrical device, a type code indicative of a model number of the electrical device, and a serial code indicative of a serial number of the electrical device.

4. The method as set forth in claim 1, further comprising the step of:
   judging the presence or absence of a malfunction in the electrical device by the management apparatus based on the malfunction information,
   the malfunction information including information that enables the management apparatus to judge the presence or absence of a malfunction in the electrical device.

5. The method as set forth in claim 1, further comprising the step of:
   judging, by the electrical device, the presence or absence of a malfunction in the communications device of the electrical device or in the electrical device itself,
   a result of judgment being incorporated in the malfunction information.

6. The method as set forth in claim 1, further comprising the steps of:
   sending control instructions from the management apparatus via the Internet to the communications device of the electrical device or to the electrical device itself; and
   controlling the electrical device based on the control instructions by the communications device of the electrical device or by the electrical device itself.

7. The method as set forth in claim 1, wherein, in the step of sending a request, the management apparatus sends the request for malfunction information with respect to one or more electrical devices such that the number of electrical devices being requested upon by the management apparatus does not exceed a predetermined number.

8. The method as set forth in claim 1, wherein:
   the electrical devices being managed include different kinds of electrical devices, and
   in the step of sending a request, the management apparatus sends the request to each of different kinds of electrical devices.

9. The method as set forth in claim 8, wherein:
   in the step of controlling a timing, the management apparatus controls the timing for sending the request so that the request is sent at different timings from one kind of electrical device to another kind of electrical device.

10. The method as set forth in claim 1, wherein:
    in the step of controlling a timing, the management apparatus controls the timing for sending the request so that a request for malfunction information sent to a group of a predetermined number of electrical devices is followed by a predetermined time period before the request to sent to a next group of a predetermined number of electrical devices.

11. A management apparatus, comprising:
    one or more electrical devices provided at a plurality of remote locations;
    sending means for sending a request for malfunction information with respect to one or more of the electrical devices via the Internet either to a communications device connected to the electrical device being managed or to the electrical device itself being managed;
    updating means, in receipt of the malfunction information indicative of a malfunction of the electrical device from the communications device or the electrical device itself, for updating a database that stores the malfunction information of the electrical device, based on the malfunction information; and timing controlling means for controlling a timing for sending the request for malfunction information with respect to one or more of the electrical devices from the sending means, monitoring a load on the management apparatus, and delaying the timing for sending the request when the load exceeds a predetermined value wherein the management apparatus is operably connected to all of the electrical devices at the plurality of remote locations.

12. The management apparatus as set forth in claim 11, further comprising:

judging means for judging the presence or absence of a malfunction in the electrical device based on the malfunction information, the malfunction information including information that enables the management apparatus to judge the presence or absence of a malfunction in the electrical device.

13. The management apparatus as set forth in claim 11, further comprising:

control means for sending control instructions with respect to one or more electrical devices via the Internet to the communications device of the electrical device or to the electrical device itself.

14. The management apparatus as set forth in claim 11, wherein the timing controlling means controls the timing for sending the request for malfunction information with respect to one or more electrical devices such that the number of electrical devices being requested upon does not exceed a predetermined number.

15. The management apparatus as set forth in claim 11, wherein:

the electrical devices being managed include different kinds of electrical devices, and the sending means sends the request to each of different kinds of electrical devices.

16. A management apparatus running a computer-program for causing a computer to execute procedures, the management apparatus comprising:

one or more electrical devices provided at a plurality of remote locations;

sending means for sending a request for malfunction information with respect to one or more of the electrical devices via the Internet either to a communications device connected to the electrical device being managed or to the electrical device itself being managed;

updating means, in receipt of the malfunction information indicative of a malfunction of the electrical device from the communications device or the electrical device itself, for updating a database that stores the malfunction information of the electrical device, based on the malfunction information; and timing controlling means for controlling a timing for sending the request for malfunction information with respect to one or more of the electrical devices from the sending means, monitoring a load on the management apparatus, and delaying the timing for sending the request when the load exceeds a predetermined value wherein the management apparatus is operably connected to all of the electrical devices at the plurality of remote locations.

17. At least one electrical device, comprising:

receiving means for receiving a request for malfunction information via the Internet from a management apparatus that includes timing controlling means for controlling a timing for sending the request for malfunction information with respect to the at least one electrical device being managed, monitoring a load on the management apparatus, and delaying the timing for sending the request when the load exceeds a predetermined value; and reply means, in response to the request for malfunction information, for returning the malfunction information, indicative of a malfunction, to the management apparatus, wherein the at least one electrical device is provided at a remote location, and the management apparatus is operably connected to the at least one electrical device.

18. The electrical device as set forth in claim 17, wherein the receiving means and the reply means are connected to the Internet via a power line that is used to supply power to the electrical device.

19. The electrical device as set forth in claim 17, wherein the malfunction information sent by the reply means include individual information for identifying the electrical device.

20. The electrical device as set forth in claim 17, further comprising:

judging means for judging the presence or absence of a malfunction, a result of judgment being incorporated in the malfunction information sent by the reply means.

21. The electrical device as set forth in claim 17, further comprising:

control means for controlling the electrical device according to control instructions, when the control instructions are sent from the management apparatus via the Internet and received by the electrical device.

22. At least one electrical device running a computer-readable program for causing a computer to execute procedures, the at least one electrical device comprising:

receiving means for receiving a request for malfunction information via the Internet from a management apparatus that includes timing controlling means for controlling a timing for sending a request for malfunction information with respect to the at least one electrical device being managed, monitoring a load on the management apparatus, and delaying the timing for sending the request when the load exceeds a predetermined value; and reply means, in response to the request for malfunction information, for returning the malfunction information, indicative of a malfunction, to the management apparatus, wherein the at least one electrical device is provided at a remote location, and the management apparatus is operably connected to the at least one electrical device.

23. A communications device, connectable to at least one electrical device, comprising:

receiving means for receiving a request for malfunction information via the Internet from a management apparatus that includes timing controlling means for controlling a timing for sending a request for malfunction information with respect to the at least one electrical device being managed, monitoring a load on the management apparatus, and delaying the timing for sending the request when the load exceeds a predetermined value; and reply means, in response to the request for malfunction information, for returning the malfunction information, indicative of a malfunction of the electrical device connected to the communications device, to the management apparatus, wherein the at least one electrical device is provided at a remote location, and the management apparatus is operably connected to the at least one electrical device.

24. The communications device as set forth in claim 23, wherein the receiving means and the reply means are connected to the Internet via a power line that is used to supply power to the electrical device.

25. The communications device as set forth in claim 23, wherein the malfunction information sent by the reply means include individual information for identifying the electrical device.

26. The communications device as set forth in claim 23, further comprising:
   judging means for judging the presence or absence of a malfunction in the electrical device connected to the communications device,
   a result of judgment being incorporated in the malfunction information sent by the reply means.

27. The communications device as set forth in claim 23, further comprising:
   control means for controlling the electrical device connected to the communications device according to control instructions, when the control instructions are sent from the management apparatus via the Internet and received by the communications device.

28. At least one electrical device running a computer-program for causing a computer that is connectable to the at least one electrical device to operate as a communications device, said at least one electrical device comprising:
   receiving means for receiving a request for malfunction information via the Internet from a management apparatus that includes timing controlling means for controlling a timing for sending a request for malfunction information with respect to the at least one electrical device being managed, monitoring a load on the management apparatus, and delaying the timing for sending the request when the load exceeds a predetermined value; and
   reply means, in response to the request for malfunction information, for returning the malfunction information, indicative of a malfunction of the electrical device connected to the communications device, to the management apparatus,
   wherein the at least one electrical device is provided at a remote location, and the management apparatus is operably connected to the at least one electrical device.

29. A management system of at least one electrical device, comprising:
   a management apparatus; and
   the at least one electrical device to be managed by the management apparatus,
   the management apparatus including
   sending means for sending a request for malfunction information with respect to one or more electrical devices via the Internet to the electrical device;
   updating means, in receipt of the malfunction information indicative of a malfunction in the electrical device from the electrical device, for updating a database that stores the malfunction information of the electrical device, based on the malfunction information; and
   timing controlling means for controlling a timing for sending the request for malfunction information with respect to the at least one electrical device from the sending means, monitoring a load on the management apparatus, and delaying the timing for sending the request when the load exceeds a predetermined value,
   the at least one electrical device including:
   receiving means for receiving the request from the management apparatus via the Internet; and
   reply means, in response to the request for malfunction information, for returning the malfunction information, indicative of a malfunction, to the management apparatus,
   wherein the at least one electrical device is provided at a remote location, and the management apparatus is operably connected to the at least one electrical device.

30. The management system of an electrical device as set forth in claim 29, wherein the timing controlling means controls the timing for sending the request for malfunction information of the electrical device with respect to one or more electrical devices such that the number of electrical devices being requested upon does not exceed a predetermined number.

31. The management system of an electrical device as set forth in claim 29, wherein:
   the electrical devices being managed include different kinds of electrical devices, and
   the sending means sends the request to each of different kinds of electrical devices.

32. The management system of an electrical device as set forth in claim 29, wherein the receiving means and the reply means are connected to the Internet via a power line that is used to supply power to the electrical device.

33. A management system of one or more electrical devices, comprising:
   a management apparatus; and
   a communications device, connected to one or more of the electrical devices to be managed by the management apparatus,
   the management apparatus including:
   sending means for sending a request for malfunction information with respect to one or more of the electrical devices via the Internet to the communications device;
   updating means, in receipt of the malfunction information indicative of a malfunction in one or more of the electrical devices from the communications device, for updating a database that stores the malfunction information of the electrical device, based on the malfunction information; and
   timing controlling means for controlling a timing for sending the request for malfunction information with respect to one or more of the electrical devices from the sending means, monitoring a load on the management apparatus, and delaying the timing for sending the request when the load exceeds a predetermined value,
   the communications device including:
   receiving means for receiving the request from the management apparatus via the Internet; and
   reply means, in response to the request for malfunction information, for returning the malfunction information, indicative of a malfunction, to the management apparatus,
   wherein the one or more electrical devices are provided at remote locations, and the management apparatus is operably connected to the one or more electrical devices.

34. The management system of an electrical device as set forth in claim 33, wherein the timing controlling means controls the timing for sending the request for malfunction information with respect to one or more electrical devices such that the number of electrical devices being requested upon does not exceed a predetermined number.

35. The management system of an electrical device as set forth in claim 33, wherein:
   the electrical devices being managed include different kinds of electrical devices, and
   the sending means sends the request to each of different kinds of electrical devices.

36. The management system of an electrical device as set forth in claim 33, wherein the receiving means and the reply means are connected to the Internet via a power line that is used to supply power to the electrical device.

* * * * *